Patented June 30, 1925.

1,543,932

UNITED STATES PATENT OFFICE.

CHAUNCEY C. LOOMIS, OF YONKERS, AND HORACE E. STUMP, OF BROOKLYN, NEW YORK, ASSIGNORS, BY MESNE ASSIGNMENTS, TO THE HEVEA CORPORATION, A CORPORATION OF NEW YORK.

USE OF COLLOIDAL SULPHUR AND LATEX.

No Drawing.   Application filed April 26, 1923. Serial No. 634,903.

*To all whom it may concern:*

Be it known that we, CHAUNCEY C. LOOMIS and HORACE E. STUMP, citizens of the United States, residing in Yonkers and Brooklyn, respectively, in the counties of Westchester and Kings, respectively, and State of New York, have invented a new and useful Improvement in the Use of Colloidal Sulphur and Latex, of which the following is a specification.

This invention relates to the manufacture of rubber, and has more particular reference to the incorporation in the unvulcanized material of a vulcanizing agent, as sulphur. Our invention contemplates the introduction of sulphur into the latex before it has been coagulated into rubber.

A principal object of the invention is the introduction of sulphur into rubber for vulcanizing purposes, in such fashion as to cheaply, quickly and easily accomplish a complete distribution thereof, and this without the necessity of the tedious and slow milling operations now in use. A colloidal solution of sulphur in water is first prepared. This may be accomplished, for example, by the addition of formaldehyde to ammonium polysulphide in the presence of a protective colloid, such as gelatine, casein, soap, etc. or by pouring ammonium polysulphide into a boiling solution of such a protective colloid. It can also be prepared by passing sulphur dioxide and hydrogen sulphide into water in the presence of a protective colloid, and in various other ways.

The resulting colloidal sulphur, if neutral or only slightly alkaline, can be mixed with latex without forcing coagulation thereof. Thus mixed, the colloidal sulphur quickly and automatically distributes itself throughout the mass. If the latex with the sulphur is heated under pressure a rapid and complete vulcanization occurs and upon subsequent coagulation rubber of desired degree of vulcanization is obtained.

Or if desired the latex with the colloidal sulphur in it may be dried or brought to cheese-like form and pressed giving the crude unvulcanized rubber with the sulphur distributed uniformly throughout it. Thereafter the usual vulcanizing process gives a rapid vulcanization and one that is more even than that which can be obtained after the sulphur has been melted into the rubber in accordance with the present practice.

We claim:

1. The process of manufacturing rubber, which comprises introducing sulphur in colloidal form into a natural latex, and subsequently vulcanizing.

2. The process of manufacturing rubber, which comprises introducing sulphur in colloidal form and neutral or slightly alkaline condition into a natural latex, and subsequently vulcanizing.

3. A material, comprising, a mixture of latex with sulphur in colloidal form.

CHAUNCEY C. LOOMIS.
HORACE E. STUMP.